(12) United States Patent
Lee et al.

(10) Patent No.: US 12,336,939 B2
(45) Date of Patent: Jun. 24, 2025

(54) RAMP SYSTEM OF VEHICLE

(71) Applicants: HYUNDAI MOTOR COMPANY, Seoul (KR); KIA CORPORATION, Seoul (KR)

(72) Inventors: Hyun Woo Lee, Hwaseong-si (KR); Ji Soo Byun, Suwon-si (KR); Sung Min You, Gimje-si (KR); Se Hoon Kim, Gimje-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 878 days.

(21) Appl. No.: 17/536,685

(22) Filed: Nov. 29, 2021

(65) Prior Publication Data
US 2022/0409451 A1    Dec. 29, 2022

(30) Foreign Application Priority Data

Jun. 25, 2021    (KR) .......................... 10-2021-0083068

(51) Int. Cl.
*A61G 3/06* (2006.01)
*B60P 1/43* (2006.01)

(52) U.S. Cl.
CPC ............. *A61G 3/061* (2013.01); *A61G 3/067* (2016.11); *B60P 1/431* (2013.01)

(58) Field of Classification Search
CPC ......... A61G 3/061; A61G 3/067; B60P 1/431; B60R 3/02
See application file for complete search history.

(56) References Cited

U.S. PATENT DOCUMENTS

| | | | | |
|---|---|---|---|---|
| 4,850,788 A * | 7/1989 | Dickson | .................. | B60P 1/431 14/71.1 |
| 5,160,236 A * | 11/1992 | Redding | ................ | A61G 3/067 14/71.1 |
| 5,380,144 A * | 1/1995 | Smith | .................... | A61G 3/061 14/71.3 |
| 5,636,399 A * | 6/1997 | Tremblay | .................. | B60R 3/02 14/71.1 |
| 6,186,733 B1 * | 2/2001 | Lewis | ..................... | B60P 1/431 414/921 |
| 6,484,344 B1 * | 11/2002 | Cooper | .................. | A61G 3/061 14/71.1 |

(Continued)

*Primary Examiner* — Jeffrey J Restifo
(74) *Attorney, Agent, or Firm* — MCDONNELL BOEHNEN HULBERT & BERGHOFF LLP

(57) ABSTRACT

A ramp system is disclosed. The ramp system is configured to move a step disposed in a frame between a ramp closed position and a ramp open position along a moving direction. The ramp system may include a driving device generating driving torque and transmitting the driving torque to the step to move the step along the moving direction, a pair of guide rails extending in the moving direction at both side portions of the frame in a traverse direction perpendicular to the moving direction, a roller rotatably disposed on each guide rail to be movable along each guide rail by rotation of the roller, and a sliding frame connected to one end portion of the step in the moving direction, wherein the step is hingedly connected to the sliding frame, and the roller is rotatably connected to both sides of the sliding frame in the traverse direction.

12 Claims, 8 Drawing Sheets

(56) References Cited

U.S. PATENT DOCUMENTS

| | | | | |
|---|---|---|---|---|
| 8,926,254 | B2* | 1/2015 | Pocobello | B62D 31/00 |
| | | | | 414/921 |
| 9,168,190 | B2* | 10/2015 | Rasekhi | B60R 3/02 |
| 9,266,458 | B2* | 2/2016 | Michaud | B60P 1/435 |
| 10,470,950 | B2* | 11/2019 | Kiser | B60P 1/433 |
| 10,994,795 | B1* | 5/2021 | Perez | B60K 15/067 |
| 11,912,236 | B2* | 2/2024 | Sato | A61G 3/067 |
| 11,970,101 | B2* | 4/2024 | Ishida | B60P 1/431 |
| 12,122,351 | B2* | 10/2024 | Date | G06V 20/52 |
| 12,179,701 | B2* | 12/2024 | Honda | A61G 3/061 |
| 2001/0038787 | A1* | 11/2001 | Beck | A61G 3/061 |
| | | | | 414/537 |
| 2006/0245883 | A1* | 11/2006 | Fontaine | A61G 3/067 |
| | | | | 414/537 |
| 2022/0409451 | A1* | 12/2022 | Lee | A61G 3/067 |
| 2022/0410783 | A1* | 12/2022 | Lee | B60R 3/02 |
| 2024/0058186 | A1* | 2/2024 | Cho | B60P 1/431 |
| 2024/0253553 | A1* | 8/2024 | Cho | B60P 1/433 |

* cited by examiner

RAMP SYSTEM OF VEHICLE

CROSS REFERENCE TO RELATED APPLICATIONS

This application claims priority to and the benefit of Korean Patent Application No. 10-2021-0083068 filed in the Korean Intellectual Property Office on Jun. 25, 2021, the entire contents of which are incorporated herein by reference.

BACKGROUND

(a) Field

The present disclosure relates to a ramp system of a vehicle, and more particularly to a ramp system of a vehicle which prevents fluctuation of a step when the step goes into or out the frame.

(b) Description of the Related Art

In general, the boarding/unboarding structure of transportation means, such as a bus, includes stairs installed in a front or a middle of a vehicle. There is no particular inconvenience when the general public uses the boarding/unboarding structure, but when using a stroller or a wheel chair, it is very difficult for the stroller or the wheel chair to get on or off the vehicle without help of others.

Recently, a ramp system in which a step is selectively drawn out from a bottom of a bus to the ground is being installed in order to overcome the above problems and increase convenience of getting on or off.

A conventional ramp system is operated in a sliding manner. That is, a frame mounted on a body of a bus and a step moving relative to the frame are connected with each other through a sliding mechanism such that the step is configured to slide on the frame. However, since the frame and the step are loosely connected for smooth sliding of the step, the step may fluctuate left and right in a moving direction or up and down during operation of the ramp system. The fluctuation of the step causes failure of the ramp system.

Accordingly, an additional mechanism for preventing the fluctuation of the step was introduced into the ramp system in addition to the mechanism for sliding the step. However, the addition of the additional mechanism for prevent the fluctuation of the step may increase weight and cost of the ramp system. In addition, the weight increase of the ramp system may lead to deterioration of fuel efficiency.

The above information disclosed in this Background section is only for enhancement of understanding of the background of the disclosure, and therefore it may contain information that does not form the prior art that is already known in this country to a person of ordinary skill in the art.

SUMMARY

The present disclosure has been made in an effort to provide a ramp system having advantages of reducing weight and cost by adding a function for preventing fluctuation of a step to a mechanism for sliding of the step.

A ramp system according to an exemplary embodiment of the present disclosure is configured to move a step disposed in a frame between a ramp closed position and a ramp open position along a moving direction. The ramp system may include a driving device generating driving torque and transmitting the driving torque to the step to move the step along the moving direction, a pair of guide rails extending in the moving direction at both side portions of the frame in a traverse direction perpendicular to the moving direction, a roller rotatably disposed on each guide rail to be movable along each guide rail by rotation of the roller, and a sliding frame connected to one end portion of the step in the moving direction, wherein the step is hingeably connected to the sliding frame, and the roller is rotatably connected to both sides of the sliding frame in the traverse direction.

The roller may obliquely contact each guide rail.

Each guide rail may include an upper guide rail mounted on an upper surface of the frame and extending downwardly, and a lower guide rail mounted on a lower surface of the frame and extending upwardly toward the upper guide rail. Here, both sides of a lower portion of the upper guide rail may be formed of first slanted surfaces such that the lower portion of the upper guide rail tapers downwardly, and both sides of an upper portion of the lower guide rail may be formed of the first slanted surfaces such that the upper portion of the lower guide rail tapers upwardly.

A receiving recess concave in a radial inner direction may be formed at a central portion of the roller in the traverse direction, and both sides of the receiving recess may be formed of second slanted surfaces corresponding to the first slanted surfaces.

The ramp system may further include a connecting portion fixed to at least one side of the sliding frame in the traverse direction, a nut disposed on an opposite side of the roller with respect to the connecting portion, and a bolt penetrating the roller and the connecting portion in the traverse direction to be coupled with the nut.

The ramp system may further include a bushing extending in the traverse direction between the roller and the bolt.

The driving device may include a pair of chain gears disposed apart from each other in the moving direction, and a chain coupled to the pair of chain gears to rotatably connect the pair of chain gears, wherein the step is mounted on the chain to be movable in the moving direction by rotation of the chain gear.

The driving device may further include a tensioner connected to the chain to apply tensile force to the chain.

A ramp system according to another exemplary embodiment of the present disclosure may include a frame mounted at a vehicle body and including an upper frame, a lower frame, and a pair of side frames connecting both sides of the upper frame and the lower frame in a traverse direction to have an inner space therein; a step disposed in the inner space of the frame, and moving in a moving direction perpendicular to the traverse direction to enter or exit the frame, a driving device providing driving torque for moving the step in the moving direction to the step, a sliding frame hingeably connected to one end portion of the step in the moving direction and being movable together with the step in the moving direction by the driving device, a pair of guide rails extending in the moving direction at both side portions of the frame in the traverse direction, each guide rail including an upper guide rail mounted on the upper frame and extending downwardly, and a lower guide rail mounted on the lower frame and extending upwardly; and a roller rotatably connected to both sides of the sliding frame in the traverse direction and rotatably disposed between the upper guide rail and the lower guide rail to be movable in the moving direction by rotation of the roller.

The roller may obliquely contact each guide rail.

Both sides of a lower portion of the upper guide rail may be formed of first slanted surfaces such that the lower portion of the upper guide rail tapers downwardly, and both sides of an upper portion of the lower guide rail may be formed of the first slanted surfaces such that the upper portion of the lower guide rail tapers upwardly.

A receiving recess concave in a radial inner direction may be formed at a central portion of the roller in the traverse direction, and both sides of the receiving recess may be formed of second slanted surfaces corresponding to the first slanted surfaces.

The ramp system may further include a connecting portion fixed to at least one side of the sliding frame in the traverse direction, and a bolt penetrating the roller in the traverse direction to be coupled to the connecting portion.

The ramp system may further include a bushing extending in the traverse direction between the roller and the bolt.

The driving device may include a pair of chain gears disposed apart from each other in the moving direction, and a chain coupled to the pair of chain gears to rotatably connect the pair of chain gears, wherein the step is mounted on the chain to be movable in the moving direction by rotation of the chain gear.

The driving device may further include a tensioner connected to the chain to apply tensile force to the chain.

According to an exemplary embodiment of the present disclosure, weight and cost of the ramp system may be reduced by adding function of preventing fluctuation of the step and assisting smooth sliding of the step to the guide rail and the roller for sliding the step. In addition, fuel efficiency of a vehicle may be improved due to weight reduction of the ramp system.

In addition, other effects of the exemplary embodiments of the present disclosure should be explicitly or implicitly described in the description provided herein. Various effects predicted according to the exemplary embodiments of the present disclosure will be disclosed in the description provided herein.

BRIEF DESCRIPTION OF THE FIGURES

The embodiments herein may be better understood by referring to the following description in conjunction with the accompanying drawings in which like reference numerals indicate identically or functionally similar elements, of which.

It should be understood that the above-referenced drawings are not necessarily to scale, presenting a somewhat simplified representation of various preferred features illustrative of the basic principles of the disclosure. The specific design features of the present disclosure, including, for example, specific dimensions, orientations, locations, and shapes, will be determined in part by the particular intended application and use environment.

DETAILED DESCRIPTION

The terminology used herein is for the purpose of describing particular embodiments only and is not intended to be limiting of the present disclosure. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

It is understood that the term "vehicle," "vehicular," "car," or other similar term as used herein is inclusive of motor vehicles, in general, such as passenger automobiles including sports utility vehicles (SUVs), buses, trucks, various commercial vehicles, watercraft including a variety of boats and ships, aircraft, and trains, and includes hybrid vehicles, hybrid electric vehicles, hydrogen powered vehicles and other alternative fuel vehicles (e.g., fuel derived from resources other than petroleum).

Figure 1:
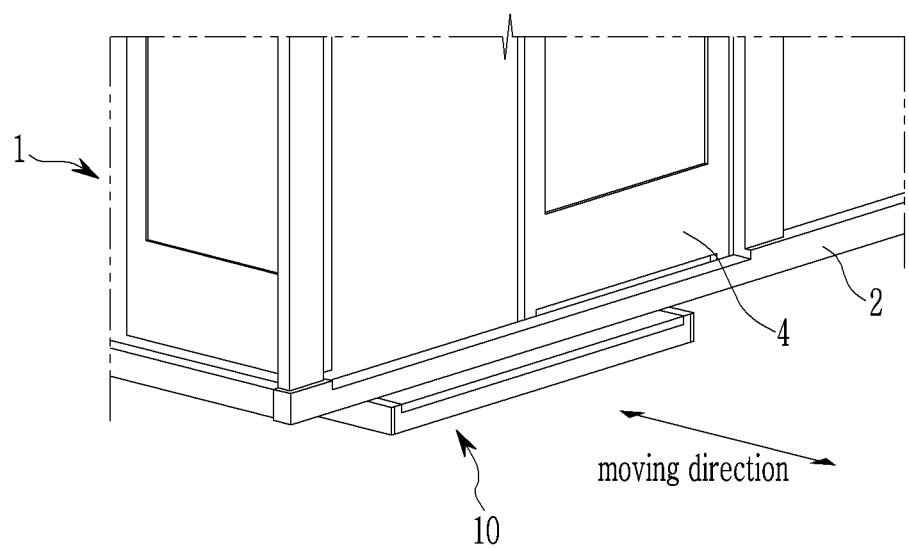
FIG. 1 illustrates a part of a vehicle to which a ramp system according to an exemplary embodiment of the present disclosure can be applied, wherein the ramp system is positioned at a ramp closed position.
Figure 2:
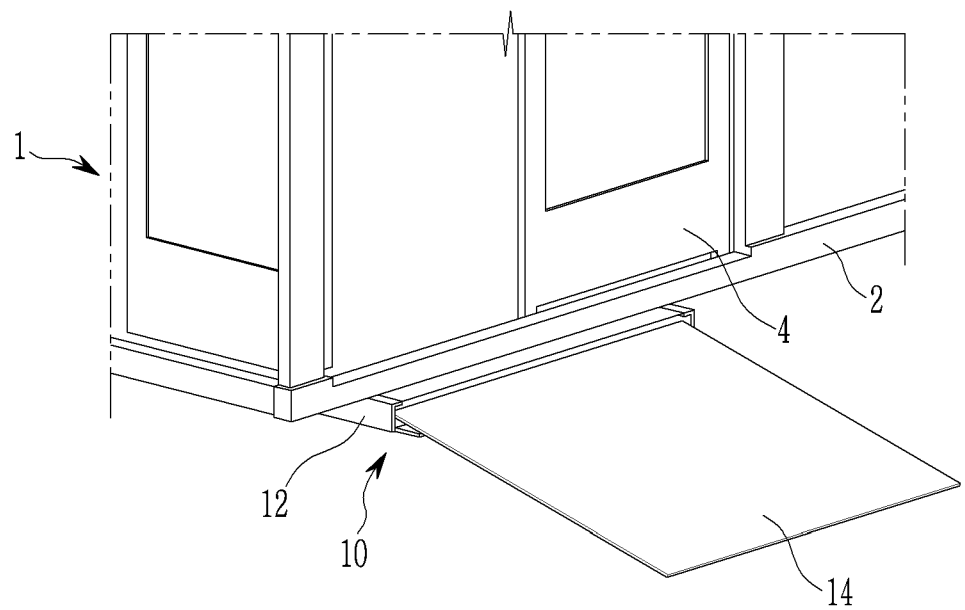
FIG. 2 illustrates a part of a vehicle to which a ramp system according to an exemplary embodiment of the present disclosure can be applied, wherein the ramp system is positioned at a ramp open position.

FIG. 1 illustrates a part of a vehicle to which a ramp system according to an exemplary embodiment of the present disclosure can be applied, wherein the ramp system is positioned at a ramp closed position; and FIG. 2 illustrates a part of a vehicle to which a ramp system according to an exemplary embodiment of the present disclosure can be applied, wherein the ramp system is positioned at a ramp open position.

Although it is exemplified in this specification and drawings that a ramp system 10 is mounted on a bus, it should be understood that a vehicle on which the ramp system 10 can be mounted is not limited to the bus.

As shown in FIG. 1 and FIG. 2, the ramp system 10 according to an exemplary embodiment of the present disclosure is mounted on a bottom surface 2 of a vehicle body 1 of the vehicle. The vehicle body 1 is provided with a door 4 for an occupant to get on or off the vehicle, and the ramp system 10 is mounted on the bottom surface 2 of the vehicle body 1 corresponding to the door 4. The ramp system 10 includes a frame 12 fixed to the bottom surface 2 of the vehicle body 1, and a step 14 sliding on the frame 12 in a moving direction to get into or out the frame 12. Here, a "ramp closed position", as shown in FIG. 1, represents a position where the step 14 enters the frame 12 as deeply as possible, and a "ramp open position", as shown in FIG. 2, represents a position where the step 14 gets out (is protruded from) the frame 12 as far as possible. Therefore, the step 14 can slide on the frame 12 between the ramp closed position and the ramp open position in the moving direction.

The step 14 may be hingedly connected to a structure (e.g., sliding frame 16) sliding in the frame 12. For example, the step 14 can be rotated toward a vertical downward direction by gravity as the step 14 protrudes out of the frame 12. Therefore, a free end portion of the step 14 (e.g., an end portion positioned farthest from the frame 12 at the ramp open position) at the ramp open position contacts the ground to strongly support the step 14 against the ground. Therefore, a wheel chair or a stroller can be safely moved on the step 14. In addition, the step 14 can be rotated to be substantially parallel to the bottom surface of the frame 12 (e.g., a lower frame 121) by the frame 12 as the step 14 enters the frame 12. Therefore, entry and exit of the step 14 becomes smooth.

Figure 3:
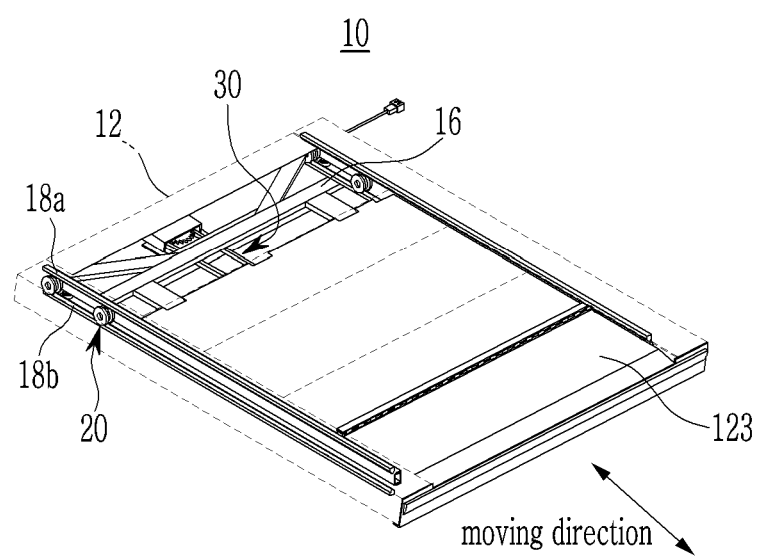
FIG. 3 is a schematic diagram of a ramp system according to an exemplary embodiment of the present disclosure which is positioned at a ramp closed position.
Figure 4:
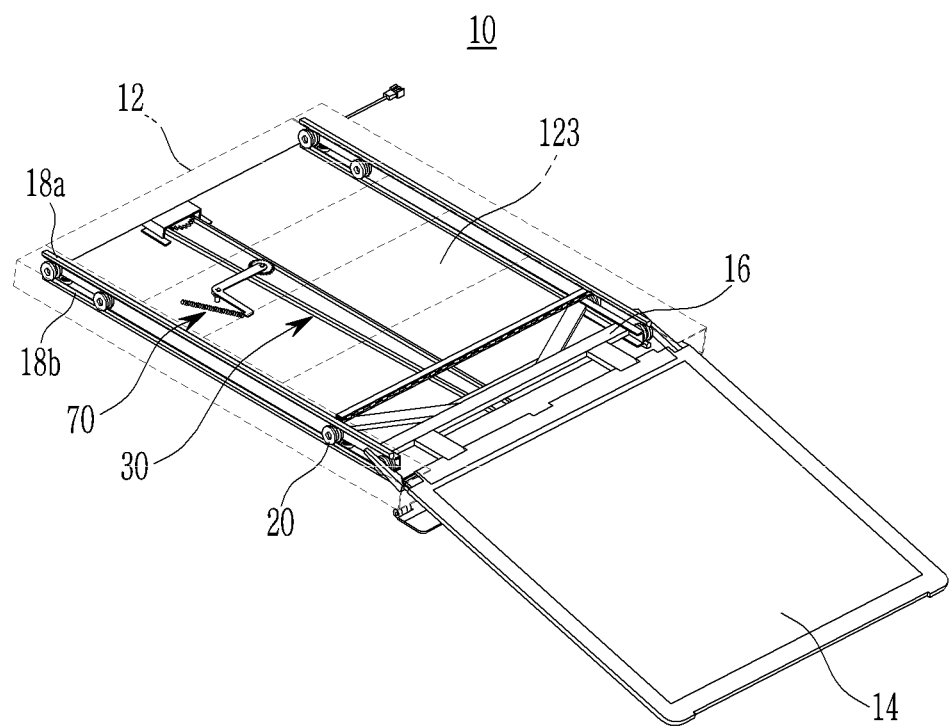
FIG. 4 is a schematic diagram of a ramp system according to an exemplary embodiment of the present disclosure which is positioned at a ramp open position.
Figure 5:
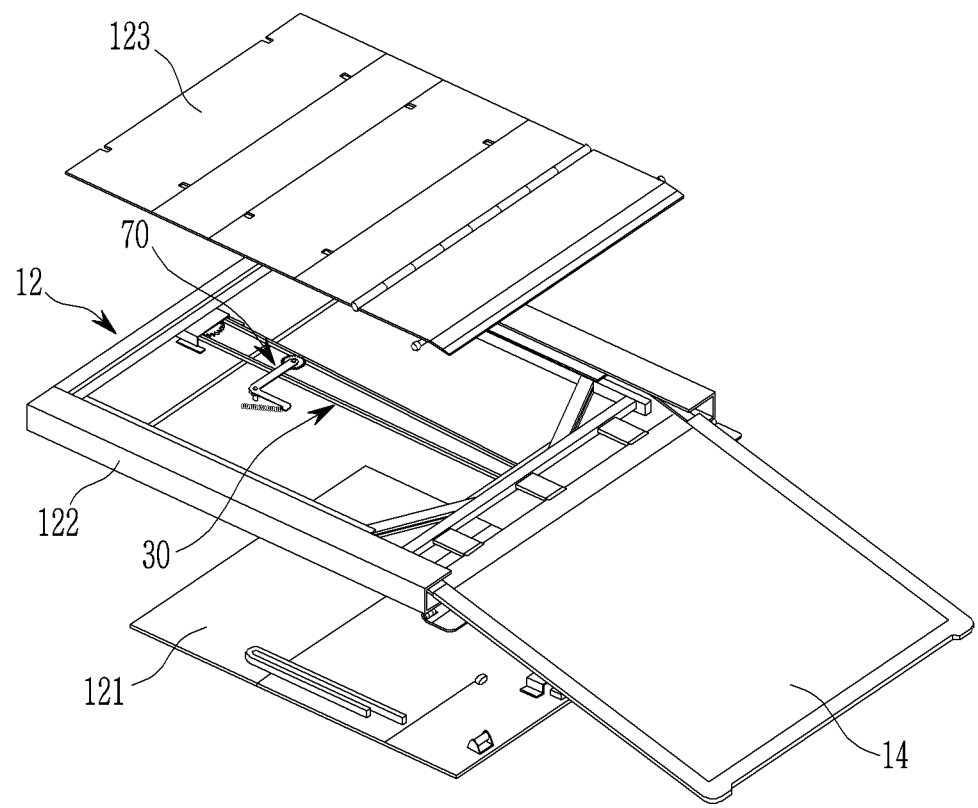
FIG. 5 is an exploded view of a ramp system according to an exemplary embodiment of the present disclosure.
Figure 6:
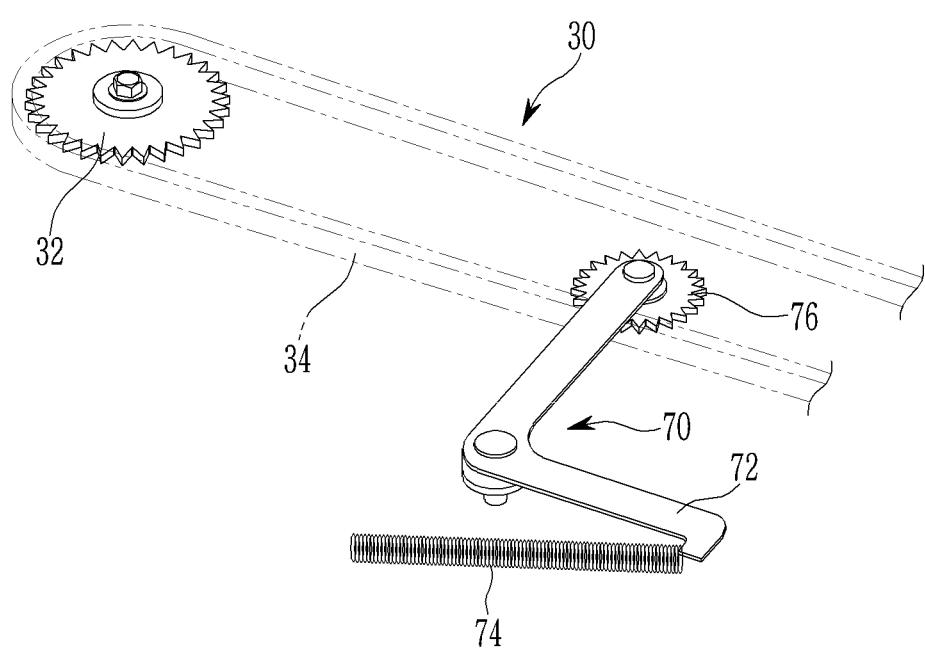
FIG. 6 is a schematic diagram illustrating a part of a driving device used in a ramp system according to an exemplary embodiment of the present disclosure.

FIG. 3 is a schematic diagram of a ramp system according to an exemplary embodiment of the present disclosure which is positioned at a ramp closed position; FIG. 4 is a schematic diagram of a ramp system according to an exemplary embodiment of the present disclosure which is positioned at a ramp open position; FIG. 5 is an exploded view of a ramp system according to an exemplary embodiment of the present disclosure; and FIG. 6 is a schematic diagram illustrating a part of a driving device used in a ramp system according to an exemplary embodiment of the present disclosure.

As shown in FIG. 3 to FIG. 6, the ramp system 10 further includes a sliding frame 16, at least one guide rail 18a and 18b, at least one roller 20, a driving device 30, and a tensioner 70 mounted in the frame 12.

The frame 12 includes a lower frame 121, a pair of side frames 122, and an upper frame 123 connected with each other. The pair of side frames 122 connects both sides of the lower frame 121 and the upper frame 123 in a traverse direction which is perpendicular to the moving direction of the step 14 such that the frame 12 has a cuboid shape having an inner space therein. However, the shape of the frame 12 is not limited to a cuboid. At least a part of the sliding frame 16, the at least one guide rail 18a and 18b, the at least one roller 20, the driving device 30, and the tensioner 70 can be disposed in the inner space of the frame 12. Here, it is illustrated in FIG. 5 that upper and lower portions of the side frame 122 are extended in the traverse direction and coupled to the upper frame 123 and the lower frame 121, respectively. It should be understood that the upper and lower portions of the side frame 122 extended in the traverse direction also constitute the upper frame 123 and the lower frame 121, respectively. Alternatively, the upper frame 123 and the lower frame 121 may be directly coupled to a top and a bottom of the side frame 122, respectively.

The sliding frame 16 is configured to slide on the frame 12 in the moving direction through the at least one roller 20 provided at each side of the sliding frame 16 in the traverse direction. The step 14 is hingedly connected to one end portion of the sliding frame 16 in the moving direction. Therefore, when the step 14 protrudes out from the frame 12 or enters the frame 12, the entry and exit of the step 14 becomes smooth by rotating the step 14 about the one end portion of the sliding frame 16 in the moving direction.

The at least one guide rail 18a and 18b is provided on at least one side of the frame 12 in the traverse direction. The at least one guide rail 18a and 18b extends in the moving direction, and at least one roller 20 provided on at least one side surface of the sliding frame 16 in the traverse direction is rotatably disposed at the at least one guide rail 18a and 18b. The sliding of the sliding frame 16 becomes smooth through the at least one guide rail 18a and 18b and the at least one roller 20, thereby preventing fluctuation of the sliding frame 16 and the step 14 connected to the sliding frame 16. The guide rail 18a and 18b and the roller 20 will be described in further detail.

The driving device 30 generates driving torque and transmits the generated driving torque to the step 14. When the driving device 30 is operated, the step 14 and the sliding frame 16 connected to the step 14 slide on the frame 12 such that the step 14 enters or exits the frame 12.

As shown in FIG. 5 and FIG. 6, the driving device 30 may include a drive motor (not shown), a pair of chain gears 32, and a chain 34 in one example.

The drive motor is mounted on the bottom surface 2 or at any suitable position of the vehicle body 1, and is connected to at least one of the pair of chain gears 32 to rotate the chain gears 32. The drive motor is connected to a power supply (e.g., a battery and the like) to receive electrical energy therefrom.

Each gear in the pair of chain gears 32 is spaced from each other in the moving direction and is connected to each other through the chain 34. The chain 34 is connected to the pair of chain gears 32 and at least one of the pair of chain gears 32 is connected to the drive motor to be rotated by the drive motor. At this time, the chain 34 is moved in the moving direction by the rotation of the chain gear 32, and the step 14 mounted on the chain 34 and the sliding frame 16 connected to the step 14 are also moved with the chain 34 in the moving direction. The pair of chain gears 32 is rotatably mounted on the lower frame 121 or the upper frame 123 and is positioned at suitable positions to move the step 14 between the ramp closed position and the ramp open position.

The tensioner 70 is connected to the chain 34 to apply tensile force to the chain 34. The tensioner 70 includes a tension bar 72 rotatably mounted at the lower frame 121 or the upper frame 123, a tension gear 76 rotatably mounted at one end portion of the tension bar 72 and engaged with the chain 34, and a tension spring 74 connected to the other end of the tension bar 72 to apply elastic force to the tension bar 72. The tensioner 70 applies the tensile force to the chain 34 so that no play exists between the chain 34 and the chain gear 32. Thereby, generation of noise can also be prevented.

Figure 7:
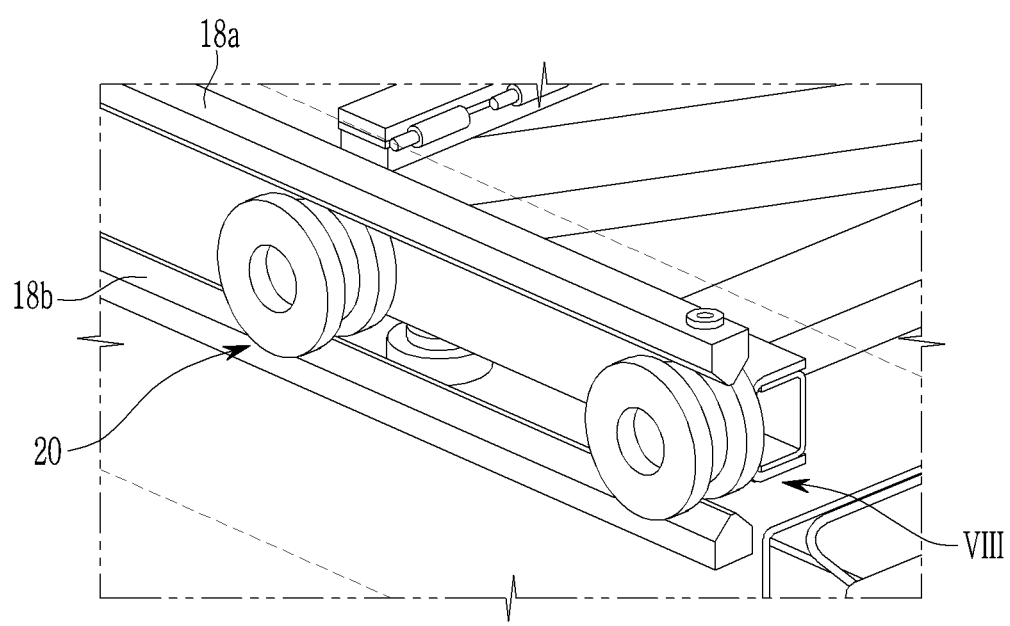
FIG. 7 illustrates rollers mounted on a guide rail in a ramp system according to an exemplary embodiment of the present disclosure.
Figure 8:
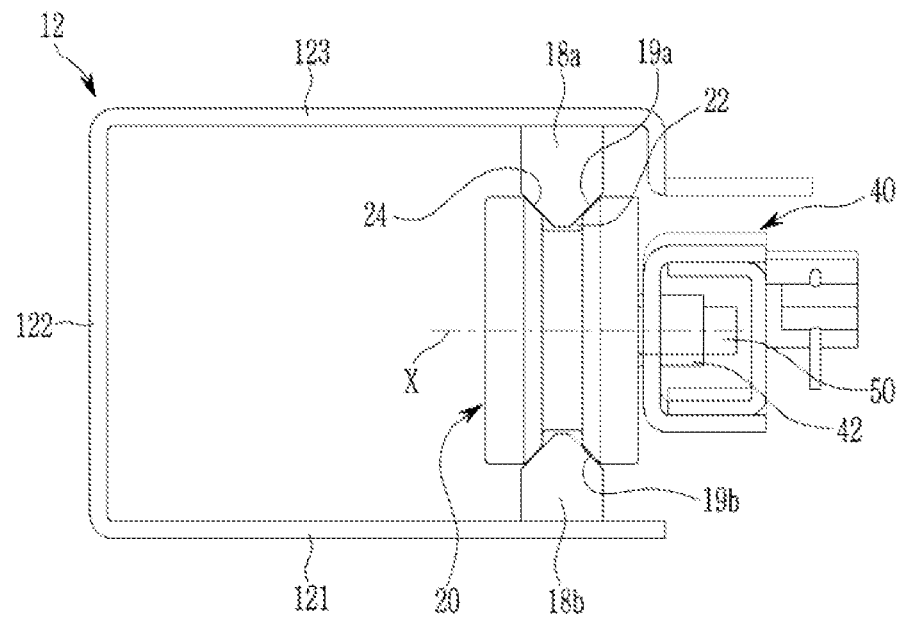
FIG. 8 illustrates a guide rail and a roller as viewed in a direction of 'VIII' in FIG. 7.
Figure 9:
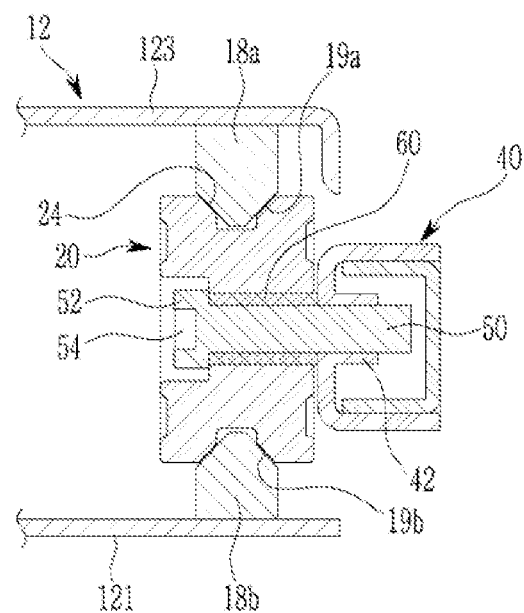
FIG. 9 is a cross-sectional view of FIG. 8.

Referring to FIG. 7 to FIG. 9, the guide rail 18a and 18b and the roller 20 are described in further detail.

FIG. 7 illustrates rollers mounted on a guide rail in a ramp system according to an exemplary embodiment of the present disclosure; FIG. 8 illustrates a guide rail and a roller as viewed in a direction of 'VIII' in FIG. 7; and FIG. 9 is a cross-sectional view of FIG. 8.

As shown in FIG. 7 to FIG. 9, the pair of guide rails 18a and 18b is mounted on both side portions of the frame 12 in the traverse direction and extends in the moving direction, and the roller 20 is rotatably disposed on each guide rail 18a and 18b.

Each guide rail 18a and 18b includes an upper guide rail 18a mounted on the upper frame 123 and extending downwardly, and a lower guide rail 18b mounted on the lower frame 121 and extending upwardly toward the upper guide rail 18a, and the upper guide rail 18a and the lower guide rail 18b are disposed on the same vertical line.

Both sides of the lower portion of the upper guide rail 18a are formed as first slanted surfaces 19a such that a distance between the first slanted surfaces 19a of the upper guide rail 18a becomes narrower toward the bottom. Similarly, both sides of the upper portion of the lower guide rail 18b are formed as first slanted surfaces 19b such that a distance between the first slanted surfaces 19b of the lower guide rail 18b becomes narrower toward the top. That is, the lower portion of the upper guide rail 18a tapers downwardly, and the upper portion of the lower guide rail 18b tapers upwardly.

Each roller 20 is rotatably disposed between the upper guide rail 18a and the lower guide rail 18b. When the roller 20 is rotated between the upper guide rail 18a and the lower guide rail 18b, the roller 20 moves in the moving direction. The roller 20 has a shape such that two cylinders having a relatively larger diameter are coupled to both surfaces of one cylinder having a relatively smaller diameter. Therefore, the roller 20 is formed of a receiving recess 22 concave in a radial inner direction at a central portion thereof in a direction of a rotation axis X (parallel to the traverse direction), and the lower portion of the upper guide rail 18a and the upper portion of the lower guide rail 18b are disposed in the receiving recess 22 such that the roller 20 is rotatably disposed between the upper guide rail 18a and the lower guide rail 18b. Both sides of the receiving recess 22 are formed as third slanted surfaces 24 corresponding to the first and second slanted surfaces 19a and 19b such that a distance between the third slanted surfaces 24 becomes narrower toward a radial inner direction. Therefore, the roller 20 obliquely contacts the guide rails 18a and 18b. The oblique contact of the guide rail 18a and 18b and the roller 20 allows the roller 20 to make close contact with the guide rail 18a and 18b over a wider range, thereby enabling the roller 20 to rotate between the guide rail 18a and 18b without fluctuation. Accordingly, when the ramp system 10 is operated, the step 14 is prevented from fluctuating up and down as well as left and right with respect to the moving direction.

Each roller 20 is rotatably connected to the sliding frame 16. In one example, a connecting portion 40 is fixed to at least one side of the sliding frame 16 in the traverse direction, and a bolt 50 penetrates the roller 20 and the connecting portion 40 in the traverse direction to be coupled with the nut 42. A bolt head 52 is formed at one end of the bolt 50 in the traverse direction, and a tool hole 54 in which a tool is inserted for rotating bolt 50 is formed at the bolt head 52. In addition, the nut 42 is fixed to the connecting portion 40. Therefore, when the bolt 50 is coupled to the nut 42, the roller 20 is positioned between the bolt 50 and the connecting portion 40. However, since the bolt 50 is not coupled to the roller 20, the roller 20 is rotatably positioned between the bolt 50 and the connecting portion 40. In addition, a bushing 60 extending in the traverse direction is disposed between the bolt 50 and the roller 20 to cause the roller 20 to be rotated smoothly.

In another example, the nut 42 is disposed on an opposite side of the roller 20 with respect to the connecting portion 40, but is not fixed to the connecting portion 40. Although the nut 42 is not fixed to the connecting portion 40, the roller 20 is rotatably positioned between the bolt 50 and the connecting portion 40 when the bolt 50 penetrates the roller 20 and the connecting portion 40 and is coupled to the nut 42.

In further example, the connecting portion 40 may function as the nut by forming a thread on the connecting portion 40. In this case, the bolt 50 penetrates the roller 20 in the traverse direction and is coupled to the connecting portion 40.

According to an exemplary embodiment of the present disclosure, the traversal fluctuation and the vertical fluctuation of the step 14 may be prevented during operation of the ramp system 10 by mounting the upper and lower guide rails 18a and 18b on the both sides of the frame 12 in the traverse direction and rotatably disposing the roller 20 between the upper and lower guide rails 18a and 18b.

In addition, the traversal fluctuation and the vertical fluctuation of the step 14 may be further prevented by obliquely contacting the upper and lower guide rails 18a and 18b with the roller 20.

Further, weight and cost of the ramp system 10 may be reduced by adding function of preventing fluctuation of the step 14 into the mechanism for sliding the step 14. Accordingly, fuel efficiency of the vehicle may be improved.

While this disclosure has been described in connection with what is presently considered to be practical exemplary embodiments, it is to be understood that the disclosure is not limited to the disclosed embodiments. On the contrary, it is intended to cover various modifications and equivalent arrangements included within the spirit and scope of the appended claims.

The invention claimed is:

1. A ramp system which moves a step disposed in a frame between a ramp closed position and a ramp open position along a moving direction, the ramp system comprising:
   a driving device generating driving torque and transmitting the driving torque to the step to move the step along the moving direction;
   a pair of guide rails extending in the moving direction at first and second side portions of the frame in a traverse direction, perpendicular to the moving direction;
   a roller rotatably disposed on each of the pair of guide rails to be movable along each guide rail by rotation of the roller; and
   a sliding frame connected to one end portion of the step in the moving direction,
   wherein the step is hingedly connected to the sliding frame, and the roller is rotatably connected to first and second sides of the sliding frame in the traverse direction; and
   wherein the roller obliquely contacts each of the pair of guide rails.

2. The ramp system of claim 1, wherein each of the pair of guide rails includes an upper guide rail mounted on an upper surface of the frame and extending downwardly, and a lower guide rail mounted on a lower surface of the frame and extending upwardly toward the upper guide rail, and
   wherein both sides of a lower portion of the upper guide rail are formed as first slanted surfaces such that the lower portion of the upper guide rail tapers downwardly, and wherein both sides of an upper portion of the lower guide rail are formed as second slanted surfaces such that the upper portion of the lower guide rail tapers upwardly.

3. The ramp system of claim 2, wherein the roller includes a central portion having a receiving recess in the transverse direction, the receiving recess being concave in a radial inner direction, and both sides of the receiving recess are formed as third slanted surfaces corresponding to the first slanted surface on the upper guide rail and the second slanted surface on the lower guide rail.

4. The ramp system of claim 1, wherein the driving device comprises:
   a pair of chain gears disposed apart from each other in the moving direction; and
   a chain coupled to the pair of chain gears to rotatably connect the pair of chain gears;
   wherein the step is mounted on the chain to be movable in the moving direction by rotation of the chain gear.

5. The ramp system of claim 4, further comprising a tensioner connected to the chain to apply tensile force to the chain.

6. A ramp system which moves a step disposed in a frame between a ramp closed position and a ramp open position along a moving direction, the ramp system comprising:
- a driving device generating driving torque and transmitting the driving torque to the step to move the step along the moving direction;
- a pair of guide rails extending in the moving direction at first and second side portions of the frame in a traverse direction, perpendicular to the moving direction;
- a roller rotatably disposed on each of the pair of guide rails to be movable along each guide rail by rotation of the roller;
- a sliding frame connected to one end portion of the step in the moving direction;
- a connecting portion fixed to at least one side of the sliding frame in the traverse direction;
- a nut disposed on an opposite side of the roller with respect to the connecting portion;
- a bolt penetrating the roller and the connecting portion in the traverse direction to be coupled with the nut; and
- a bushing extending in the traverse direction between the roller and the bolt;
- wherein the step is hingedly connected to the sliding frame, and the roller is rotatably connected to first and second sides of the sliding frame in the traverse direction.

7. A ramp system, comprising:
- a frame mounted at a vehicle body and including an upper frame, a lower frame, and a pair of side frames connecting both sides of the upper frame and the lower frame in a traverse direction creating an inner space therein;
- a step disposed in the inner space of the frame, and moving in a moving direction perpendicular to the traverse direction to enter or exit the frame;
- a driving device providing driving torque to the step for moving the step in the moving direction;
- a sliding frame hingedly connected to one end portion of the step in the moving direction and being movable together with the step in the moving direction by the driving device;
- a pair of guide rails extending in the moving direction at both side portions of the frame in the traverse direction, each of the plurality of guide rails including an upper guide rail mounted on the upper frame and extending downwardly, and a lower guide rail mounted on the lower frame and extending upwardly; and
- a roller rotatably connected to both sides of the sliding frame in the traverse direction and rotatably disposed between the upper guide rail and the lower guide rail to be movable in the moving direction by rotation of the roller;
- wherein the roller obliquely contacts each of the plurality of guide rails.

8. The ramp system of claim 7, wherein both sides of a lower portion of the upper guide rail are formed as first slanted surfaces such that the lower portion of the upper guide rail tapers downwardly, and both sides of an upper portion of the lower guide rail are formed as second slanted surfaces such that the upper portion of the lower guide rail tapers upwardly, and
- wherein the roller includes a central portion having a receiving recess in the transverse direction, the receiving recess being concave in a radial inner direction, and both sides of the receiving recess are formed as third slanted surfaces corresponding to the first slanted surface on the upper guide rail and the second slanted surfaces on the lower guide rail.

9. The ramp system of claim 7, further comprising:
- a connecting portion fixed to at least one side of the sliding frame in the traverse direction; and
- a bolt penetrating the roller in the traverse direction to be coupled to the connecting portion.

10. The ramp system of claim 9, further comprising a bushing extending in the traverse direction between the roller and the bolt.

11. The ramp system of claim 7, wherein the driving device comprises:
- a pair of chain gears disposed apart from each other in the moving direction; and
- a chain coupled to the pair of chain gears to rotatably connect the pair of chain gears,
- wherein the step is mounted on the chain to be movable in the moving direction by rotation of the chain gear.

12. The ramp system of claim 11, further comprising a tensioner connected to the chain to apply tensile force to the chain.

* * * * *